US012165620B2

(12) United States Patent
Yoshino

(10) Patent No.: US 12,165,620 B2
(45) Date of Patent: Dec. 10, 2024

(54) SUPPORT BODY, ATTACHMENT, AND SUPPORT METHOD

(71) Applicant: Roland Corporation, Shizuoka (JP)

(72) Inventor: Kiyoshi Yoshino, Shizuoka (JP)

(73) Assignee: Roland Corporation, Shizuoka (JP)

( * ) Notice: Subject to any disclaimer, the term of this patent is extended or adjusted under 35 U.S.C. 154(b) by 445 days.

(21) Appl. No.: 17/433,243

(22) PCT Filed: Feb. 27, 2019

(86) PCT No.: PCT/JP2019/007624
§ 371 (c)(1),
(2) Date: Aug. 24, 2021

(87) PCT Pub. No.: WO2020/174617
PCT Pub. Date: Sep. 3, 2020

(65) Prior Publication Data

US 2022/0157279 A1 May 19, 2022

(51) Int. Cl.
*G10D 13/02* (2020.01)

(52) U.S. Cl.
CPC .................................... *G10D 13/02* (2013.01)

(58) Field of Classification Search
CPC ........ G10D 13/02; G10D 13/28; G10D 13/14; G10D 13/00
See application file for complete search history.

(56) References Cited

U.S. PATENT DOCUMENTS

| | | | |
|---|---|---|---|
| 5,492,047 | A | 2/1996 | Oliveri |
| 7,498,500 | B2 | 3/2009 | Rogers |
| 7,514,617 | B2 | 4/2009 | Rogers et al. |
| 7,781,661 | B2 | 8/2010 | Rogers et al. |
| RE43,885 | E | 1/2013 | Rogers et al. |
| 2018/0082667 | A1 | 3/2018 | Bean et al. |

FOREIGN PATENT DOCUMENTS

| | | | |
|---|---|---|---|
| JP | 2002169537 | 6/2006 | |
| JP | 2015203869 | 11/2015 | |
| JP | 2015203869 A * | 11/2015 | ........... G10D 13/024 |
| JP | 2018146749 | 9/2018 | |
| WO | WO-2018211741 A1 * | 11/2018 | ............. G10D 13/02 |

OTHER PUBLICATIONS

"International Search Report (Form PCT/ISA/210) of PCT/JP2019/007624", mailed on May 14, 2019, with English translation thereof, pp. 1-3.
Sabian, "Quiet Tone Training Pad" with English translation thereof, available at: https://gatewaydrumline.com/shop/lt/tp/qu/, retrieved on Jun. 2, 2021, pp. 1-4.

* cited by examiner

*Primary Examiner* — Kimberly R Lockett
(74) *Attorney, Agent, or Firm* — JCIPRNET

(57) ABSTRACT

The disclosure provides a support body, an attachment, and a support method. The support body is in an annular shape for supporting an attachment on a head of a drum and includes a body part in an annular shape configured to be able to directly or indirectly support the attachment, wherein the attachment is configured to be supportable via the body part by making a lower end part of the body part be supported by an edge part of the head.

22 Claims, 5 Drawing Sheets

(a)

(b)

(a)

(b)

SUPPORT BODY, ATTACHMENT, AND SUPPORT METHOD

CROSS-REFERENCE TO RELATED APPLICATION

This application is a 371 application of the International PCT application serial no. PCT/JP2019/007624, filed on Feb. 27, 2019. The entirety of the above-mentioned patent application is hereby incorporated by reference herein and made a part of this specification.

BACKGROUND

Technical Field

The disclosure relates to a support body, an attachment, and a support method, and more particularly, to a support body, an attachment, and a support method with which it is possible to stably support an attachment on a drum.

Description of Related Art

There is known a technique for supporting attachments such as dampeners and electronic percussion instruments on a drum. For example, Patent Document 1 describes a technique for supporting an attachment (electronic drum) on an upper end portion (flange part of a holding rim) of a hoop.

RELATED ART

Patent Document

[Patent Document 1] Japanese Laid-Open No. 2015-203869 (for example, paragraphs 0014 to 0016 and FIGS. 5 and 6)

SUMMARY

Technical Problem

However, the shape and the diameter of the upper end portion of the drum hoop may differ depending on the type, and even if the hoops of the same type are used, the diameter of each hoop varies. Therefore, if a configuration is adopted in which the attachment is supported at the upper end portion of the hoop as in the above-described conventional technique, due to the difference in the shapes of the hoops and the variation in the diameters of the hoops, it may be difficult to support the attachment at an appropriate position on each hoop. That is, in the above-described conventional technique, if the hoop (the portion supporting the attachment) has a diameter different from the desired diameter, for example, a gap in the radial direction is formed between the hoop and the attachment, and there is a problem that it may be difficult to stably support the attachment.

The disclosure has been made to solve the above-mentioned problem and provides a support body with which it is possible to stably support an attachment on a drum, an attachment, and a support method.

Solution to the Problem

In view of the above, a support body according to the disclosure is in an annular shape for supporting an attachment on a head of a drum. The support body includes a body part in an annular shape configured to be able to directly or indirectly support the attachment. The attachment is configured to be supportable via the body part by making a lower end part of the body part be supported by an edge part of the head.

An attachment according to the disclosure has a support body in an annular shape integrally formed on a lower surface of the attachment. The support body includes a body part in an annular shape configured to be able to directly or indirectly support the attachment. The attachment is supported via the body part by making a lower end part of the body part be supported by an edge part of the head.

A support method according to the disclosure is a support method for supporting an attachment on a head of a drum via a support body. The support body includes a body part in an annular shape. The support method includes supporting the attachment via the body part by supporting the attachment directly or indirectly by the body part and by making a lower end part of the body part be supported by an edge part of the head.

DESCRIPTION OF THE EMBODIMENTS

Figure 1:
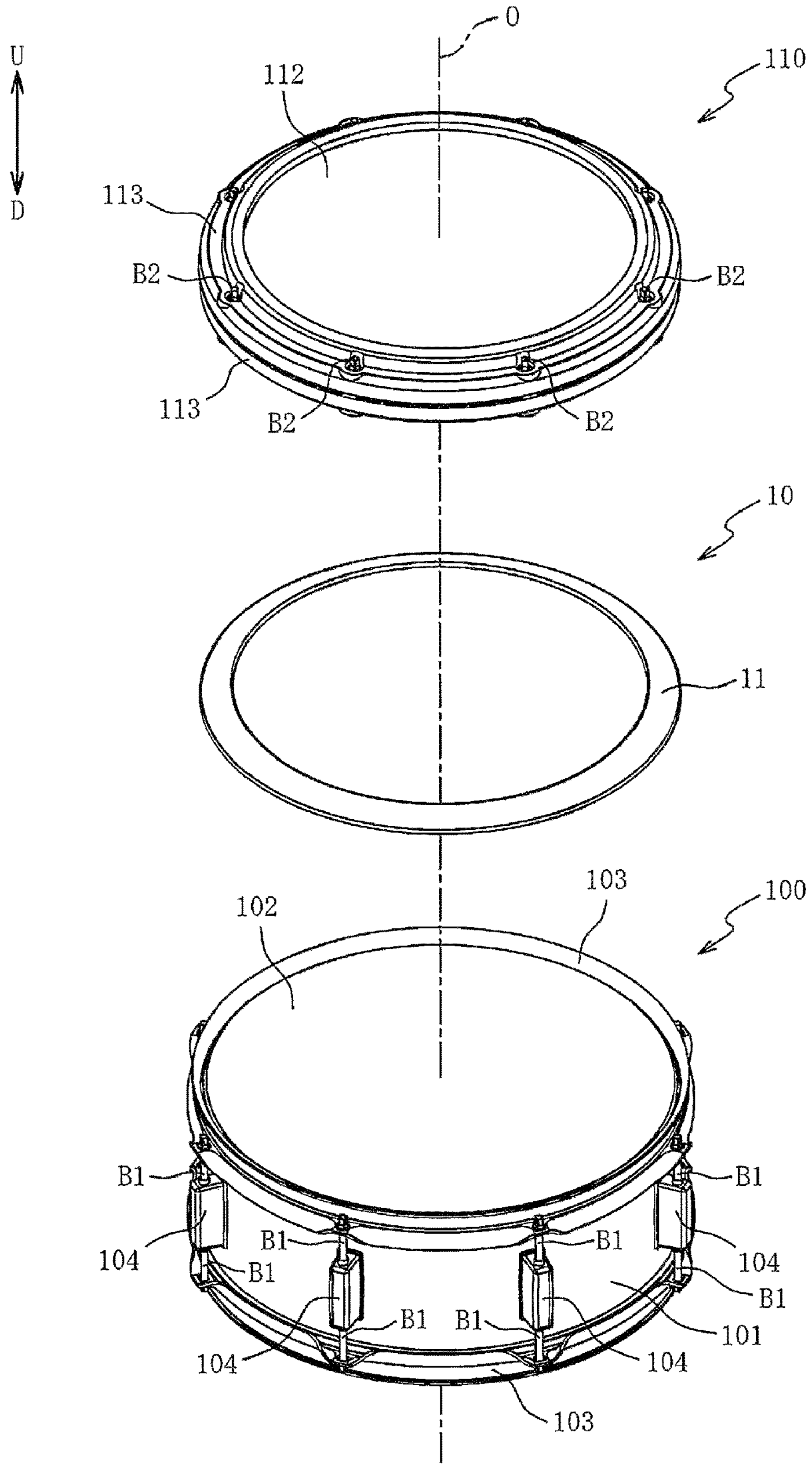
FIG. 1 is an exploded front perspective view of the mount member, the drum, and the dampening pad according to the first embodiment.
Figure 2:
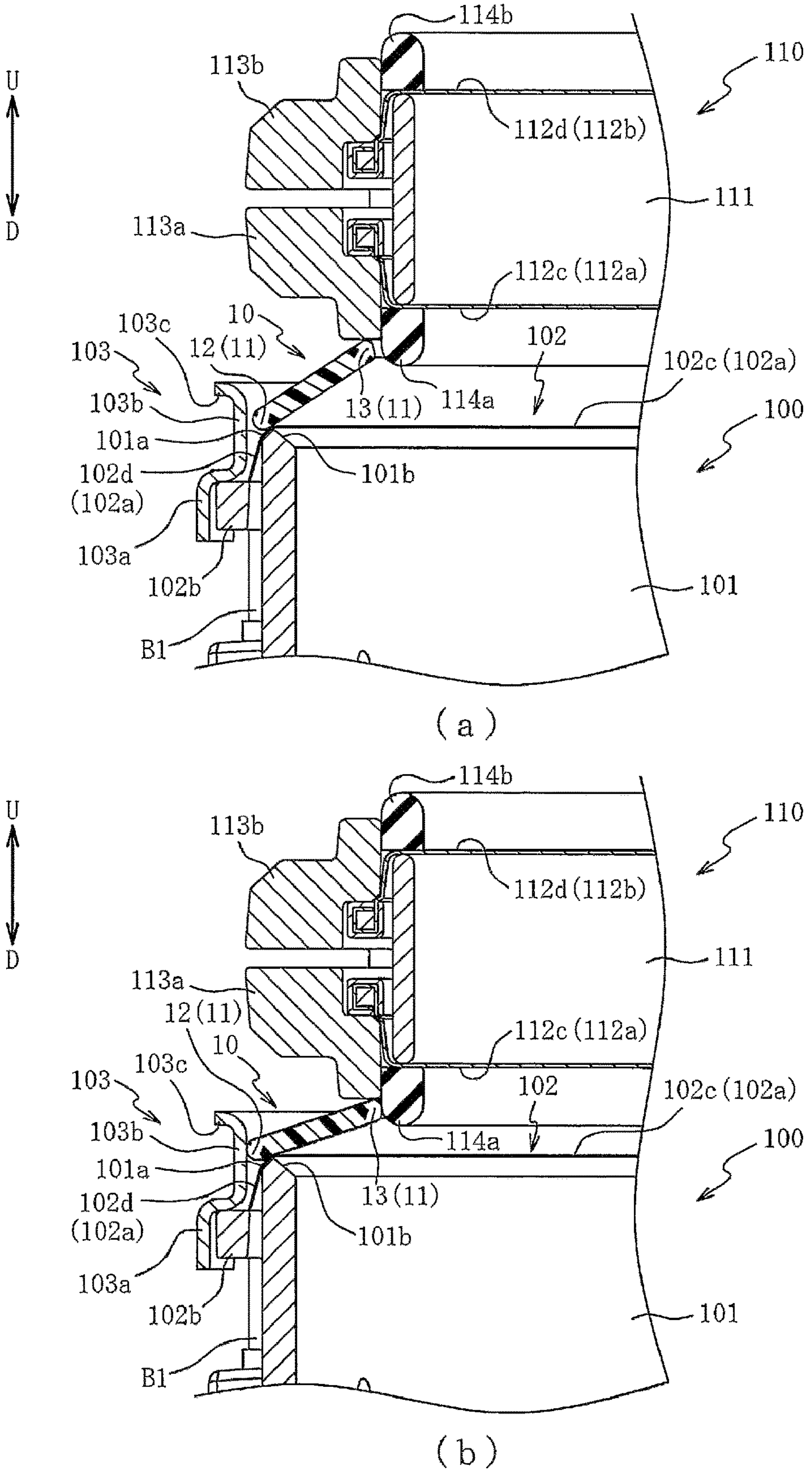
FIG. 2 is a partially enlarged cross-sectional view of the mount member, the drum, and the dampening pad.

Hereinafter, exemplary embodiments will be described with reference to the accompanying drawings. First, configurations of a mount member 10, a drum 100, and a dampening pad 110 according to a first embodiment will be described with reference to FIGS. 1 and 2. FIG. 1 is an exploded front perspective view of the mount member 10, the drum 100, and the dampening pad 110 according to the first embodiment. FIG. 2 is a partially enlarged cross-sectional view of the mount member 10, the drum 100, and the dampening pad 110, and corresponds to a cross section taken along a plane including an axis O of FIG. 1.

Further, in FIG. 2, (a) shows a state where the mount member 10 is disposed on a head 102 of the drum 100 before the weight of the dampening pad 110 acts on the mount member 10 (hereinafter referred to as the "pre-support state"). Further, in FIG. 2, (b) shows a state where the mount member 10 is elastically deformed by the weight of the dampening pad 110 from the state shown in (a) of FIG. 2, and the dampening pad 110 is supported on the drum 100 via the mount member 10 (hereinafter referred to as the "support state").

Further, the arrow U-D in FIG. 1 indicates the up-down direction of the drum 100 (axis O direction), and the same applies to FIG. 2 and the following figures. Further, in the pre-support state and the support state, the axis of the mount member 10 and the axis of the dampening pad 110 are disposed in a posture in which they are aligned with the axis O of the drum 100, and hereinafter, the "axis O of the drum 100" is simply referred to as the "axis O."

As shown in FIGS. 1 and 2, the drum 100 includes a shell 101 formed in a tubular shape, a pair of heads 102 covering openings formed on both upper and lower sides of the shell 101, a pair of hoops 103 for fixing the heads 102 to the shell 101, and fixing parts 104 attached to the outer peripheral surface of the shell 101.

Further, the drum 100 may be provided with the head 102 only on the upper surface side of the shell 101. Further, the shell 101 may be formed by closing the lower surface side and opening only the upper surface side. Further, although the drum 100 is configured as an acoustic drum, it may be configured as an electronic drum.

An outer inclined part 101*a* that inclines upward from the outer peripheral surface of the shell 101 toward the inner side in the radial direction and an inner inclined part 101*b* that inclines downward from the inner edge of the outer inclined part 101*a* toward the inner side in the radial direction are formed at the upper end part of the shell 101.

The head 102 is a member that forms a striking surface 102*c* to be hit by a stick or the like (not shown). The head 102 includes a film member 102*a* that covers the opening formed in the shell 101 and a frame member 102*b* that is connected to the outer edge of the film member 102*a*. The inner peripheral side of the film member 102*a* is configured as the striking surface 102*c*, and the outer peripheral side is configured as an edge part 102*d*, with the connecting portion between the outer inclined part 101*a* and the inner inclined part 101*b* of the shell 101 as a boundary. The edge part 102*d* is disposed in contact with the outer inclined part 101*a*.

Further, the upper end part of the shell 101 may be formed in a curved shape. In this case, the upper end (the end part on the arrow U direction side) of the shell 101 serves as a boundary, and the inner peripheral side with respect to the boundary is configured as the striking surface 102*c* of the film member 102*a*, and the outer peripheral side is configured as the edge part 102*d*. As described above, regardless of the shape of the upper end part of the shell 101, in the film member 102*a*, the inner peripheral side with respect to the portion in contact with the upper end of the shell 101 is defined as the striking surface 102*c*, and the outer peripheral side is defined as the edge part 102*d*.

The hoop 103 is an annular member for applying tension to the head 102 (striking surface 102*c*). The hoop 103 includes a frame contact part 103*a* that contacts the frame member 102*b* of the head 102, an annular part 103*b* that extends upward from the upper end of the frame contact part 103*a*, and a flange part 103*c* that protrudes from the upper end of the annular part 103*b* toward the outer side in the radial direction. Tension is applied to the head 102 by tightening bolts B1 inserted into through holes (not shown) of the frame contact parts 103*a* to the fixing parts 104.

The dampening pad 110 is for preventing the striking surface 102*c* of the drum 100 from being directly hit. The dampening pad 110 includes a dampening shell 111 in a tubular shape, a pair of dampening heads 112 covering openings formed on both upper and lower sides of the dampening shell 111, a pair of dampening hoops 113 for fixing the dampening heads 112 to the dampening shell 111, and a pair of hit parts 114 fixed to the inner peripheral surface of the dampening hoops 113 and disposed at the edges of the openings of the dampening shell 111 via the dampening heads 112.

Further, the pair of dampening heads 112, the pair of dampening hoops 113, and the pair of hit parts 114 are disposed symmetrically in the up-down direction. The ones disposed on the lower surface side (arrow D direction side) are denoted as the dampening head 112*a*, the dampening hoop 113*a* and the hit part 114*a*, and the ones disposed on the upper surface side (arrow U direction side) are denoted as the dampening head 112*b*, the dampening hoop 113*b* and the hit part 114*b* to be distinguished from each other by different reference numerals.

Tension is applied to the dampening heads 112*a* and 112*b* by the dampening hoops 113*a* and 113*b* in a state where the dampening heads 112*a* and 112*b* cover the openings formed in the dampening shell 111. In the dampening heads 112*a* and 112*b*, the regions surrounded by the hit parts 114*a* and 114*b* are configured as striking surfaces 112*c* and 112*d* of the dampening pad 110, respectively.

Tension is applied to the dampening heads 112*a* and 112*b* by tightening bolts B2 inserted into through holes (not shown) of the pair of dampening hoops 113*a* and 113*b* to nuts (not shown). The hit part 114*a* (114*b*) is formed in an annular shape using a rubbery elastic body, and is disposed to protrude downward (upward) from the dampening hoop 113*a* (113*b*).

The vibration generated by hitting the striking surface 112*d* on the upper surface side of the dampening pad 110 with a stick or the like (not shown) is propagated by air to the striking surface 102*c* of the drum 100 via the striking surface 112*c* on the lower surface side. The striking surface 102*c* vibrates due to the vibration propagated by air, whereby sound is emitted from the drum 100. By vibrating the striking surface 102*c* of the drum 100 by the vibration propagated by air in this way, the volume of sound emitted from the drum 100 can be reduced as compared with the case where the striking surface 102*c* of the drum 100 is directly hit.

Further, since the dampening head 112*a* is disposed between the striking surface 112*d* on the upper surface side of the dampening pad 110 and the striking surface 102*c* of the drum 100, the vibration propagated by air to the striking surface 102*c* of the drum 100 can be dampened by the dampening head 112*a*, and the volume of sound emitted from the drum 100 can be reduced.

The mount member 10 is used for the drum 100 to support the dampening pad 110, and a body part 11 of the mount member 10 is formed in an annular shape using a synthetic resin having a predetermined elasticity. Further, the predetermined elasticity is such that when the dampening pad 110 is disposed on the body part 11, the body part 11 is elastically deformed by the weight of the dampening pad 110, and the striking surface 102*c* of the drum 100 and the dampening pad 110 can be supported at a predetermined distance.

If the outer peripheral side portion of the body part 11 is defined as an outer peripheral part 12, and the inner peripheral side portion is defined as an inner peripheral part 13, then the body part 11 is formed to be inclined upward from the outer peripheral part 12 toward the inner peripheral part 13. In other words, the body part 11 is formed to have a diameter that is gradually decreased from the lower end side (arrow D direction side) to the upper end side (arrow U direction side). The body part 11 is formed so that its thickness dimension in a direction orthogonal to its inclination direction is substantially constant over the entire circumference.

Next, a support method of supporting the dampening pad 110 on the drum 100 will be described with reference to FIG. 2. As shown in (a) of FIG. 2, by disposing the mount member 10 on the head 102 of the drum 100, the pre-support state is formed.

In the pre-support state, the outer diameter of the body part 11 of the mount member 10 is formed to be slightly smaller (for example, by 1 mm) than the inner diameter of the annular part 103*b* of the hoop 103. As a result, when the mount member 10 is disposed on the drum 100, it is possible to prevent the hoop 103 from coming into contact with the outer peripheral part 12 of the mount member 10, and the mount member 10 can be easily disposed on the head 102 of the drum 100.

Further, in the pre-support state, the upper end of the body part 11 of the mount member 10 is located above the upper end of the flange part 103*c* of the hoop 103.

Next, the dampening pad 110 is placed on the inner peripheral part 13 of the mount member 10 so that the hit part 114*a* of the dampening pad 110 is passed through the inner peripheral side of the body part 11 of the mount member 10. In this case, the inner diameter of the body part 11 of the mount member 10 is formed to be slightly larger (for example, by 1 mm) than the outer diameter of the hit part 114*a* of the dampening pad 110. As a result, the dampening pad 110 can be easily placed on the inner peripheral part 13 of the mount member 10.

As shown in (b) of FIG. 2, when the dampening pad 110 is placed onto the mount member 10 from the pre-support state, the weight of the dampening pad 110 acts on the mount member 10. The body part 11 is elastically deformed by the weight of the dampening pad 110, and the inclination (inclination with respect to the striking surface 102*c*) of the body part 11 of the mount member 10 in the support state is smaller than that in the pre-support state. In other words, the body part 11 is elastically deformed by the weight of the dampening pad 110 to increase the outer diameter of the body part 11 (outer peripheral part 12). Therefore, the outer peripheral part 12 of the body part 11 can be brought into close contact with the inner peripheral surface of the annular part 103*b* of the hoop 103. Further, the body part 11 is elastically deformed to decrease the inner diameter of the body part 11 (inner peripheral part 13). Therefore, the inner peripheral part 13 of the body part 11 can be brought into close contact with the outer peripheral surface of the hit part 114*a* of the dampening pad 110.

As a result, the relative displacement of the mount member 10 with respect to the hoop 103 (drum 100) in the radial direction is regulated by the contact between the hoop 103 and the outer peripheral part 12 of the mount member 10. Further, the relative displacement of the mount member 10 with respect to the dampening pad 110 in the radial direction is regulated by the contact between the inner peripheral part 13 of the mount member 10 and the hit part 114*a*. As a result, the dampening pad 110 can be stably supported on the drum 100.

Here, the flange part 103*c* is formed in the hoop 103 of this embodiment, but depending on the type of the hoop, the protrusion amount in the radial direction may be larger (or smaller) than that of the flange part 103*c* of the embodiment. Further, some types of hoops do not have the flange part 103*c*. Therefore, if the flange part 103*c* (upper end portion of the hoop 103) is configured to support the dampening pad 110 as in the conventional case, it may not be possible to support the dampening pad 110 depending on the types of the hoops.

On the other hand, since the inner diameter of the hoop 103 is formed according to the outer diameter (diameter) of the drum 100, even for hoops of different types from the hoop 103 of the embodiment, it is easy for them to have consistent inner diameters. Therefore, as in the embodiment, by supporting the dampening pad 110 by the mount member 10 (by using the inner peripheral surface of the annular part 103*b* of the hoop 103), the dampening pad 110 can be supported on various types of hoops.

In particular, since the diameter of the body part 11 is gradually decreased from the lower end side (arrow D direction side) to the upper end side (arrow U direction side), the dampening pad 110 can be supported on the head 102 of the drum 100 by using the mount member 10 regardless of the shape of the inner peripheral surface on the upper end side of the hoop 103 (by using the inner peripheral surface of the annular part 103*b* on the central side in the up-down direction).

Further, even if the hoops are used for drums having the same diameter, the inner diameter of the annular part varies depending on the hoop. However, if the body part 11 of the mount member 10 is configured to be elastically deformed (the outer diameter increases) as in the embodiment, the mount member 10 can be brought into close contact with the annular part 103*b* of the hoop 103. In other words, even if the inner diameter of the annular part 103*b* of the hoop 103 varies, it is possible to prevent a gap from being formed between the inner peripheral surface of the annular part 103*b* and the mount member 10 (outer peripheral part 12). As a result, the dampening pad 110 can be stably supported on the drum 100 via the mount member 10.

In the embodiment, the body part 11 is elastically deformed by the weight of the dampening pad 110 to increase the outer diameter of the body part 11 (outer peripheral part 12), whereby the body part 11 is supported on the drum 100 in contact with the edge part 102*d*. That is, the body part 11 of the mount member 10 and the striking surface 102*c* of the drum 100 are in a non-contact state in a region on the inner side in the radial direction of the connecting portion between the outer inclined part 101*a* and the inner inclined part 101*b* of the shell 101. As a result, it is possible to prevent the vibration of the striking surface 102*c* from being hindered, and it is possible to prevent the sound quality of the sound emitted from the drum 100 from changing.

Further, even in the support state where the weight of the dampening pad 110 acts on the mount member 10, the body part 11 (inner peripheral part 13) of the mount member 10 maintains a shape in which its diameter is gradually decreased from the lower end side (arrow D direction side) to the upper end side (arrow U direction side), and maintains a state of being separated from the head 102 of the drum 100 by the predetermined distance.

Therefore, it is possible to prevent the inner peripheral part 13 of the body part 11 of the mount member 10 and the dampening pad 110 from coming into contact with the striking surface 102*c* of the drum 100. As a result, it is possible to prevent the vibration of the striking surface 102c from being hindered, and it is possible to prevent the sound quality of the sound emitted from the drum 100 from changing. Further, it is possible to prevent the hitting force applied to the striking surface 112*d* on the upper surface side of the dampening pad 110 by a stick or the like (not shown) from acting on the striking surface 102*c* of the drum 100 via the mount member 10 and the hit part 114*a*, and it is possible to prevent the striking surface 102*c* from being damaged.

Further, even if the hit part 114*a* of the dampening pad 110 comes into contact with the striking surface 102*c* of the drum 100, since the hit part 114*a* is formed by using a rubbery elastic body, it is possible to more effectively prevent the striking surface 102*c* of the drum 100 from being damaged.

Further, in the embodiment, the body part 11 (outer peripheral part 12) of the mount member 10 and the striking surface 102*c* of the drum 100 are not in contact with each other; however, the body part 11 (outer peripheral part 12) of the mount member 10 and the striking surface 102*c* may be in contact with each other as long as the contact is in a region slightly inward (for example, within 1 cm) in the radial direction from the outer edge of the striking surface 102*c* (the position where the film member 102*a* and the upper end of the shell 101 contact). If the contact is within such a region, it is possible to suppress a large influence on the vibration of the striking surface 102*c*.

In addition, in order to reliably prevent the vibration of the striking surface 102*c* from being hindered, it is preferable that the body part 11 (outer peripheral part 12) of the mount member 10 and the striking surface 102*c* of the drum 100 are not in contact with each other at least in a region on the inner side in the radial direction with respect to the inner peripheral surface of the shell 101, and it is more preferable that the body part 11 (outer peripheral part 12) of the mount member 10 and the striking surface 102*c* of the drum 100 are not in contact with each other in a region on the inner side in the radial direction with respect to the connecting portion between the outer inclined part 101*a* and the inner inclined portion part of the shell 101.

Further, in the support state, the outer peripheral part 12 of the mount member 10 is in close contact with the outer inclined part 101*a* of the shell 101 and the inner peripheral surface of the hoop 103, and the inner peripheral part 13 of the mount member 10 is in close contact with the lower surface of the dampening hoop 113*a* and the outer peripheral surface of the hit part 114*a*. As a result, the space surrounded by the striking surface 102*c* of the drum 100, the mount member 10, and the dampening pad 110 can be easily sealed. As a result, it is possible to prevent the sound caused by the vibration of the striking surface 102*c* of the drum 100 from leaking to the outside from this space.

Next, a mount member 20 according to a second embodiment will be described with reference to FIG. 3. Further, the same parts as those in the above-described first embodiment are denoted by the same reference numerals, and the description thereof will be omitted.

Figure 3:
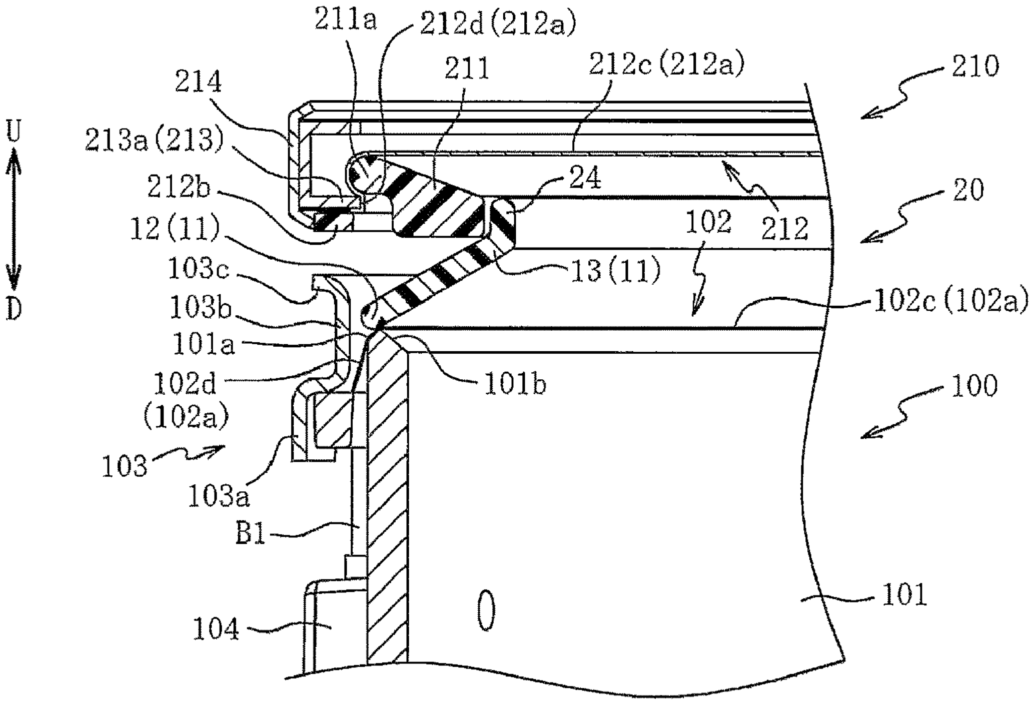
FIG. 3 is a partially enlarged cross-sectional view of the mount member, the drum, and a dampening pad according to the second embodiment.
Figure 3:
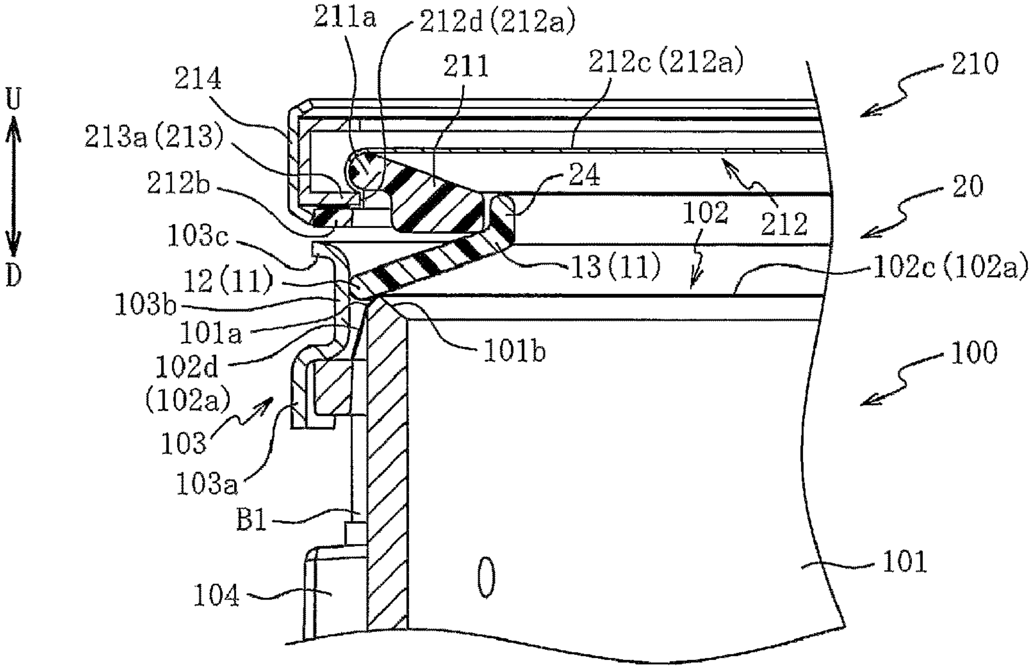

FIG. 3 is a partially enlarged cross-sectional view of the mount member 20, the drum 100, and a dampening pad 210 according to the second embodiment, and corresponds to a cross section taken along a plane including the axis O of FIG. 1. Further, (a) of FIG. 3 shows the pre-support state, and (b) of FIG. 3 shows the support state.

As shown in FIG. 3, the mount member 20 according to the second embodiment further includes, in addition to the body part 11 of the mount member 10 in the first embodiment, a protruding part 24 in an annular shape protruding upward (arrow U direction) from the inner edge of the inner peripheral part 13, and the body part 11 and the protruding part 24 are formed integrally.

The dampening pad 210 includes a dampening shell 211 formed in a tubular shape, a dampening head 212 covering an opening formed on the upper end side (arrow U direction side) of the dampening shell 211, and a ring member 213 and a tension ring 214 that apply tension to the dampening head 212.

A protruding part 211*a* in an annular shape protruding outward in the radial direction is formed on the outer edge portion of the upper end of the dampening shell 211, and the dampening head 212 is wound around the protruding part 211*a*. The dampening head 212 includes a film member 212*a* that covers the opening formed in the dampening shell 211 and a frame member 212*b* that is connected to the outer edge of the film member 212*a*. The inner peripheral side of the film member 212*a* with respect to the contacting portion with the protruding part 211*a* of the dampening shell 211 is configured as a striking surface 212*c*, and the outer peripheral side is configured as an edge part 212*d*.

The frame member 212*b* is disposed below the protruding part 211*a* of the dampening shell 211. The edge part 212*d* of the dampening head 212 located on the lower surface side of the protruding part 211*a* is pushed inward in the radial direction by the ring member 213.

The ring member 213 and the tension ring 214 are annular members for applying tension to the dampening head 212 (striking surface 212*c*) by decreasing their diameters. The ring member 213 includes a film contact part 213*a* for pushing the edge part 212*d* of the dampening head 212 inward in the radial direction. As the diameter of the tension ring 214 is decreased, the diameter of the ring member 213 (film contact part 213*a*) is decreased, whereby the edge part 212*d* of the dampening head 212 is pushed inward in the radial direction by the film contact part 213*a*. As a result, tension is applied to the dampening head 212.

Next, a support method of supporting the dampening pad 210 on the drum 100 will be described. As shown in (a) of FIG. 3, by disposing the mount member 20 on the head 102 of the drum 100, the pre-support state is formed. Next, the dampening pad 210 is placed on the mount member 20 so that the protruding part 24 of the mount member 20 is passed through the inner peripheral side of the dampening shell 211 of the dampening pad 210.

In this case, the outer diameter of the protruding part 24 of the mount member 20 is formed to be slightly smaller (for example, by 0.5 mm) than the inner diameter of the dampening shell 211. As a result, the dampening pad 210 can be easily placed on the mount member 20.

As shown in (b) of FIG. 3, when the dampening pad 210 is placed on the upper surface of the mount member 20 from the pre-support state, the weight of the dampening pad 210 acts on the mount member 20. The body part 11 is elastically deformed by the weight of the dampening pad 210, and the inclination (inclination with respect to the striking surface 102*c*) of the body part 11 of the mount member 20 in the support state is smaller than that in the pre-support state. In other words, the body part 11 is elastically deformed by the weight of the dampening pad 210 to increase the outer diameter of the body part 11 (outer peripheral part 12). Therefore, the outer peripheral part 12 of the mount member 20 can be brought into close contact with the inner peripheral surface of the annular part 103*b* of the hoop 103.

As a result, the relative displacement of the mount member 20 with respect to the hoop 103 (drum 100) in the radial direction is regulated by the contact between the annular part 103*b* of the hoop 103 and the outer peripheral part 12 of the mount member 20. Further, the relative displacement of the mount member 20 with respect to the dampening pad 210 in the radial direction is regulated by the contact between the protruding part 24 of the mount member 20 and the dampening shell 211 of the dampening pad 210. Therefore, as in the first embodiment, the dampening pad 210 can be stably supported on the drum 100, and the dampening pad 210 can be supported on various types of hoops.

Further, the body part 11 is elastically deformed by the weight of the dampening pad 210 to increase the outer diameter of the body part 11 (outer peripheral part 12), whereby the body part 11 is supported on the drum 100 in contact with the edge part 102*d*. That is, the body part 11 of the mount member 20 and the striking surface 102*c* of the drum 100 are not in contact with each other. As a result, it is possible to prevent the vibration of the striking surface 102*c* from being hindered, and it is possible to prevent the sound quality of the sound emitted from the drum 100 from changing.

Here, since the protruding part 24 is formed on the inner peripheral part 13 of the mount member 20, the rigidity in the vicinity of the protruding part 24 is relatively high. As a result, when the mount member 20 is elastically deformed by the weight of the dampening pad 210, it is possible to easily prevent the protruding part 24 from being deformed to decrease the outer diameter (a gap is formed between the protruding part 24 and the dampening shell 211). As a result, even when the mount member 20 is elastically deformed, the displacement of the mount member 20 in the radial direction can be regulated by the contact between the dampening shell 211 and the protruding part 24. Therefore, the dampening pad 210 can be stably supported on the drum 100.

Further, since the configuration is adopted in which the displacement of the dampening pad 210 in the radial direction is regulated by bringing the protruding part 24 into contact with the inner peripheral surface of the dampening shell 211, the dampening shell 211 can be disposed on the outer peripheral side of the protruding part 24. That is, since the dampening shell 211 can be supported by the body part 11 of the mount member 20, it is possible to prevent the dampening shell 211 from coming into contact with the striking surface 102*c* of the drum 100. As a result, since it is possible to prevent the vibration of the striking surface 102*c* of the drum 100 from being hindered by the dampening shell 211, it is possible to prevent the sound quality of the sound emitted from the drum 100 from changing.

Next, a mount member 30 according to a third embodiment will be described with reference to FIG. 4. Further, the same parts as those in the above-described embodiments are denoted by the same reference numerals, and the description thereof will be omitted.

Figure 4:
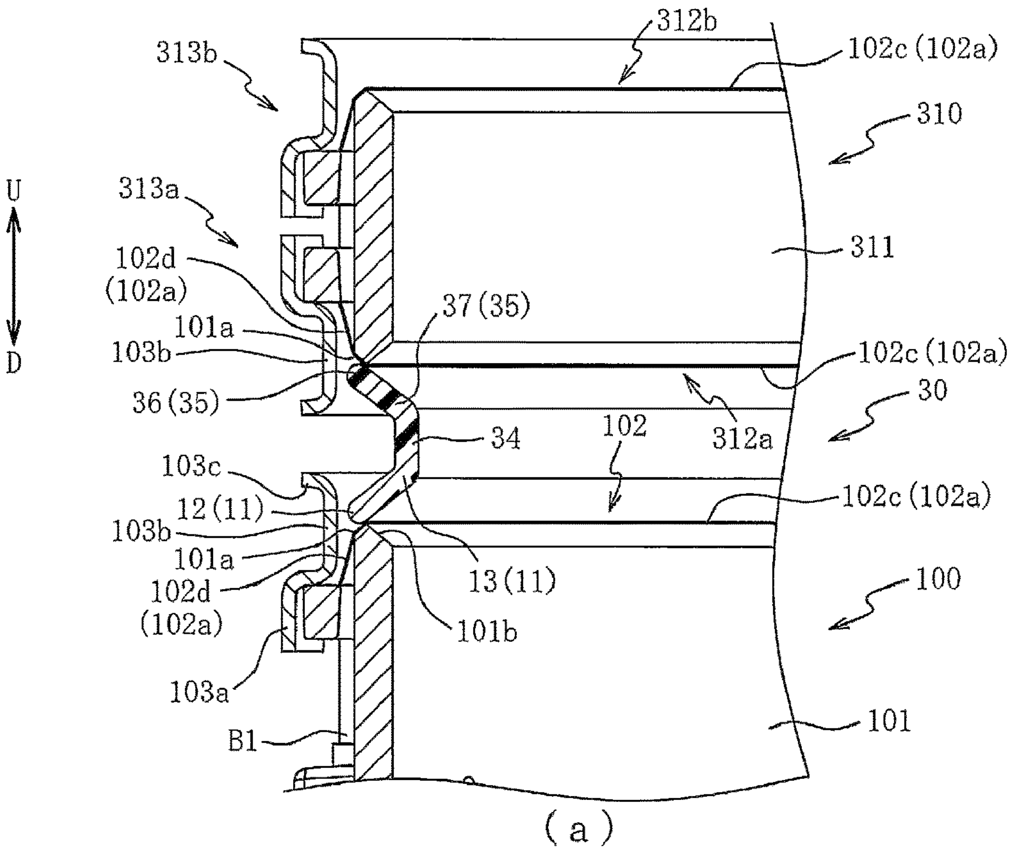
FIG. 4 is a partially enlarged cross-sectional view of the mount member, the drum, and a dampening pad according to the third embodiment.
Figure 4:
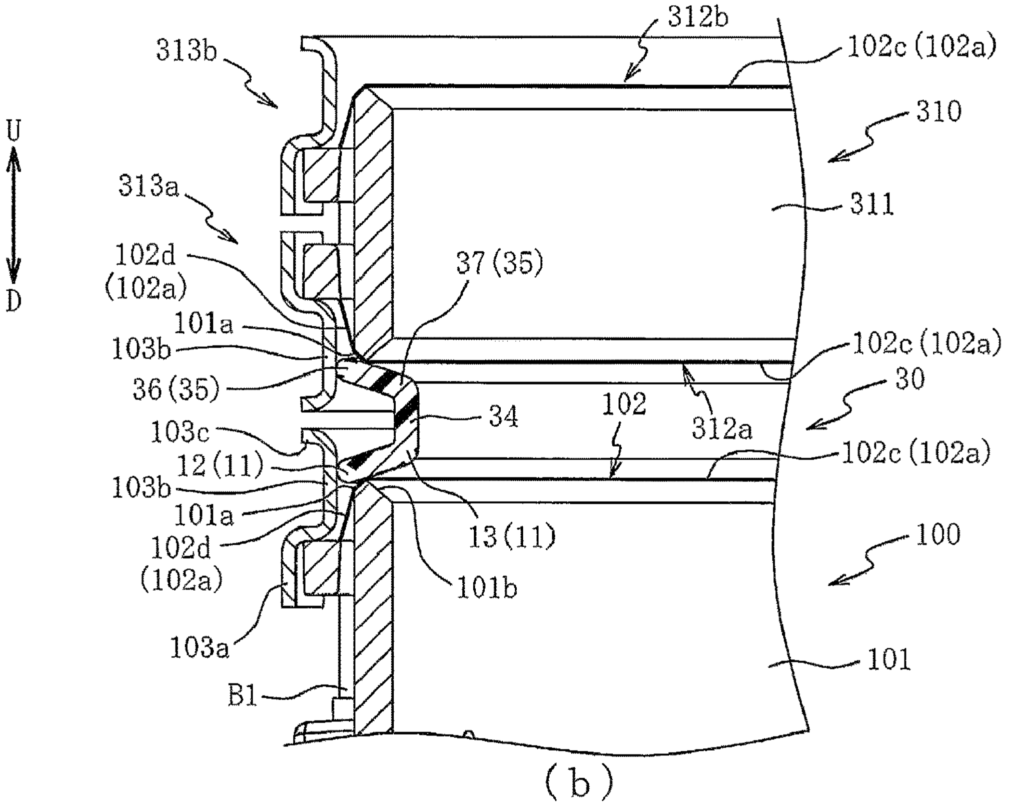

FIG. 4 is a partially enlarged cross-sectional view of the mount member 30, the drum 100, and a dampening pad 310 according to the third embodiment, and corresponds to a cross section taken along a plane including the axis O of FIG. 1. Further, (a) of FIG. 4 shows the pre-support state, and (b) of FIG. 4 shows the support state.

As shown in FIG. 4, the mount member 30 according to the third embodiment further includes, in addition to the body part 11 of the mount member 10 in the first embodiment, a protruding part 34 in an annular shape extending upward (arrow U direction) from the inner peripheral side of the inner peripheral part 13 and a support part 35 in an annular shape inclining upward from the upper end of the protruding part 34 toward the outer side in the radial direction, and the body part 11, the protruding part 34 and the support part 35 are formed integrally.

If the outer peripheral side portion of the support part 35 is defined as an outer peripheral part 36, and the inner peripheral side portion is defined as an inner peripheral part 37, then the support part 35 is formed to be inclined downward from the outer peripheral part 36 toward the inner peripheral part 37. In other words, the support part 35 is formed to have a diameter that is gradually decreased from the upper end side to the lower end side.

The dampening pad 310 includes a dampening shell 311 formed in a tubular shape, a pair of dampening heads 312 covering openings formed on both the upper and lower sides of the dampening shell 311, and a pair of dampening hoops 313 for fixing the dampening heads 312 to the dampening shell 311.

Further, since the dampening shell 311 is formed the same as the shell 101 in the first embodiment except that the length in the axis O direction (arrow U-D direction) is different, the description thereof will be omitted. Further, since the configuration and fixing structure of the pair of dampening heads 312 and the pair of dampening hoops 313 are the same as those of the heads 102 and the hoops 103 of the drum 100, the description thereof will be omitted.

Further, in order to facilitate understanding, the dampening head 312 and the dampening hoop 313 disposed on the lower surface side of the dampening pad 310 are denoted as the dampening head 312*a* and the dampening hoop 313*a*, and the ones disposed on the upper surface side are denoted as the dampening head 312*b* and the dampening hoop 313*b* to be distinguished from each other by different reference numerals.

Next, a support method of supporting the dampening pad 310 on the drum 100 will be described. As shown in (a) of FIG. 4, by disposing the mount member 30 on the head 102 of the drum 100, the pre-support state is formed. Next, the dampening pad 310 is placed on the mount member 30 so that the support part 35 of the mount member 30 is passed through the inner peripheral side of the dampening hoop 313*a* of the dampening pad 310.

In this case, the outer diameter of the support part 35 of the mount member 30 is formed to be slightly smaller (for example, by 1 mm) than the inner diameter of the annular part 103*b* of the dampening hoop 313*a*. As a result, the dampening pad 310 can be easily placed on the mount member 30.

As shown in (b) of FIG. 4, when the dampening pad 310 is placed on the upper surface of the mount member 30 from the pre-support state, the weight of the dampening pad 310 acts on the mount member 30. The body part 11 is elastically deformed by the weight of the dampening pad 310, and the inclination (inclination with respect to the striking surface 102*c*) of the body part 11 of the mount member 30 in the support state is smaller than that in the pre-support state. In other words, the body part 11 is elastically deformed by the weight of the dampening pad 310 to increase the outer diameter of the body part 11 (outer peripheral part 12). Therefore, the outer peripheral part 12 of the mount member 30 can be brought into close contact with the inner peripheral surface of the annular part 103*b* of the hoop 103.

Further, the support part 35 is elastically deformed by the weight of the dampening pad 310, and the inclination (inclination with respect to the striking surface 102*c* of the dampening pad 310) of the support part 35 of the mount member 30 in the support state is smaller than that in the pre-support state. In other words, the support part 35 is elastically deformed by the weight of the dampening pad 310 to increase the outer diameter of the support part 35 (outer peripheral part 36). Therefore, the outer peripheral part 36 of the support part 35 can be brought into close contact with the inner peripheral surface of the annular part 103*b* of the dampening hoop 313*a*.

As a result, the relative displacement of the mount member 30 with respect to the hoop 103 (drum 100) in the radial direction is regulated by the contact between the annular part 103*b* of the hoop 103 and the outer peripheral part 12 of the mount member 30. Further, the relative displacement of the mount member 30 with respect to the dampening pad 310 in the radial direction is regulated by the contact between the support part 35 of the mount member 30 and the annular part 103*b* of the dampening hoop 313*a*. Therefore, as in the first embodiment, the dampening pad 310 can be stably supported on the drum 100, and the dampening pad 310 can be supported on various types of hoops.

Further, the body part 11 is elastically deformed by the weight of the dampening pad 310 to increase the outer diameter of the body part 11 (outer peripheral part 12), whereby the body part 11 is supported on the drum 100 in contact with the edge part 102*d*. That is, the body part 11 of the mount member 30 and the striking surface 102*c* of the drum 100 are not in contact with each other.

Further, the support part 35 is elastically deformed by the weight of the dampening pad 310 to increase the outer diameter of the support part 35 (outer peripheral part 36), whereby the support part 35 supports the dampening pad 310 in contact with the edge part 102*d*. That is, the support part 35 of the mount member 30 and the striking surface 102*c* of the dampening pad 310 (dampening head 312*a*) are not in contact with each other.

As a result, it is possible to prevent the vibration of the striking surface 102*c* of the drum 100 and the vibration of the striking surface 102*c* of the dampening pad 310 from being hindered, and it is possible to prevent the sound quality of the sound emitted from the drum 100 from changing.

Here, if the configuration as in the second embodiment (see FIG. 3) is adopted in which the displacement of the dampening pad 210 in the radial direction is regulated by bringing the protruding part 24 into contact with the inner peripheral surface of the dampening shell 211, as the mount member 20 is elastically deformed, the outer diameter of the protruding part 24 may be decreased, and a gap in the radial direction may be formed between the protruding part 24 and the dampening shell 211.

On the other hand, in the embodiment, as shown in FIG. 4, the support part 35 of the mount member 30 is elastically deformed to increase the outer diameter, and the outer peripheral part 36 of the support part 35 can be brought into close contact with the annular part 103*b* of the dampening hoop 313*a*. As a result, in a configuration in which the support part 35 (outer peripheral part 36) is brought into contact with the inner peripheral surface of the annular part 103*b* of the dampening hoop 313*a*, it is possible to prevent a gap in the radial direction from being formed between the support part 35 and the annular part 103*b* of the dampening hoop 313*a* as the mount member 30 is elastically deformed. Therefore, the dampening pad 310 can be stably supported on the drum 100.

Further, even when the inner diameter of the dampening hoop 313*a* (annular part 103*b*) is formed larger than the inner diameter of the inner peripheral part 13 of the body part 11, the dampening pad 310 can be supported by bringing the outer peripheral part 36 of the support part 35 into contact with the dampening shell 311 and the inner peripheral surface of the annular part 103*b* of the dampening hoop 313*a*.

Further, even in the support state, the support part 35 of the mount member 30 maintains a shape in which its diameter is gradually decreased from the upper end side (arrow U direction side) to the lower end side (arrow D direction side). Therefore, it is possible to prevent the support part 35 from coming into contact with the striking surface 102*c* of the dampening head 312*a*. As a result, it is possible to prevent the vibration of the striking surface 102*c* of the dampening head 312*a* from being hindered.

Further, in the embodiment, the outer peripheral part 36 of the support part 35 and the striking surface 102*c* of the dampening head 312*a* are not in contact with each other; however, even if the outer peripheral part 36 of the support part 35 and the striking surface 102*c* are in contact with each other, as long as the contact is in a region slightly on the inner peripheral side (for example, within 1 cm) from the outer edge of the striking surface 102*c*, the vibration of the striking surface 102*c* is not significantly influenced.

Next, a dampening pad 410 provided with a mount member according to a fourth embodiment will be described with reference to FIG. 5. Further, the same parts as those in the above-described embodiments are denoted by the same reference numerals, and the description thereof will be omitted.

Figure 5:
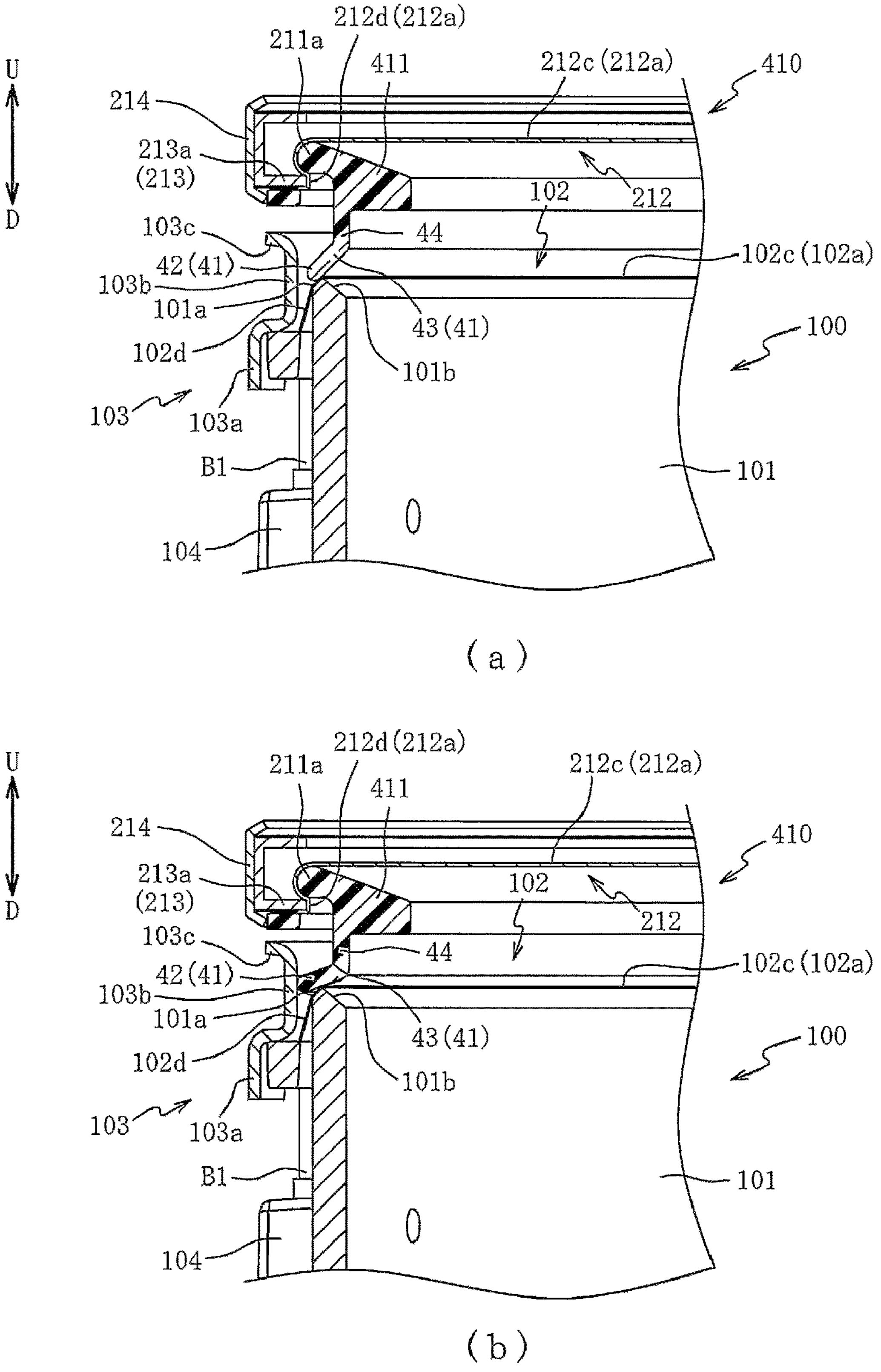
FIG. 5 is a partially enlarged cross-sectional view of the drum and the dampening pad according to the fourth embodiment.

FIG. 5 is a partially enlarged cross-sectional view of the drum 100 and the dampening pad 410 according to the fourth embodiment, and corresponds to a cross section taken along a plane including the axis O of FIG. 1. Further, (a) of FIG. 5 shows the pre-support state, and (b) of FIG. 5 shows the support state.

As shown in FIG. 5, the dampening pad 410 according to the fourth embodiment is formed the same as the dampening pad 210 according to the second embodiment except for a dampening shell 411.

The dampening shell 411 further includes, in addition to the dampening shell 211 in the second embodiment, a protruding part 44 in an annular shape protruding downward (arrow D direction) from the lower surface of the dampening shell 411 and a body part 41 in an annular shape inclining downward from the lower end of the protruding part 44 toward the outer side in the radial direction, and the protruding part 44 and the body part 41 are formed integrally with the dampening shell 411. Further, the outer peripheral side portion of the body part 41 is defined as an outer peripheral part 42, and the inner peripheral side portion is defined as an inner peripheral part 43.

Further, the protruding part 44 and the body part 41 in this embodiment have substantially the same configuration as the protruding part 24 and the body part 11 in the second embodiment except that they are integrally formed with the dampening shell 411. Therefore, in this embodiment, the protruding part 44 and the body part 41 correspond to the "support body" of claim 1.

Next, a support method of supporting the dampening pad 410 on the drum 100 will be described. As shown in (a) of FIG. 5, in the pre-support state, the outer diameter of the outer peripheral part 42 of the body part 41 of the dampening pad 410 is formed to be slightly smaller (for example, by 1 mm) than the inner diameter of the annular part 103*b* of the hoop 103. As a result, the dampening pad 410 can be easily placed on the head 102 of the drum 100.

As shown in (b) of FIG. 5, when the dampening pad 410 is placed on the head 102 of the drum 100 from the pre-support state, the weight of the dampening pad 410 acts on the body part 41. The body part 41 is elastically deformed by the weight of the dampening pad 410, and the inclination (inclination with respect to the striking surface 102*c*) of the body part 41 in the support state is smaller than that in the pre-support state. In other words, the body part 41 is elastically deformed by the weight of the dampening pad 410 to increase the outer diameter of the body part 41 (outer peripheral part 42). Therefore, the outer peripheral part 42 of the body part 41 can be brought into close contact with the inner peripheral surface of the annular part 103*b* of the hoop 103.

As a result, the relative displacement of the dampening pad 410 with respect to the hoop 103 (drum 100) in the radial direction is regulated by the contact between the annular part 103*b* of the hoop 103 and the body part 41 (outer peripheral part 42) of the dampening pad 410. Therefore, as in the first embodiment, the dampening pad 410 can be stably supported on the drum 100, and the dampening pad 410 can be supported on various types of hoops. Further, since the body part 41 is integrally formed with the dampening shell 411, the number of parts can be reduced, and the product cost can be reduced.

Further, the body part 41 is elastically deformed by the weight of the dampening pad 410 to increase the outer diameter of the body part 41 (outer peripheral part 42), whereby the body part 41 is supported on the drum 100 in contact with the edge part 102*d*. That is, the body part 41 of the dampening pad 410 and the striking surface 102*c* of the drum 100 are not in contact with each other. As a result, it is possible to prevent the vibration of the striking surface 102*c* from being hindered, and it is possible to prevent the sound quality of the sound emitted from the drum 100 from changing.

As described above, according to the mount members 10, 20 and 30 and the dampening pad 410 of each of the above embodiments, even when attachments (dampening pads 110, 210, 310 and 410) having different shapes and diameters are supported on the drum 100, various types of attachments can be stably supported on the drum 100 by forming the shapes of the upper end side of the mount members (portion that supports the attachments) according to the shapes and diameters of the attachments, or by forming the mount members integrally with the attachments.

Although the disclosure has been described based on the above embodiments, the disclosure is not limited to the above embodiments, and it can be easily inferred that various modifications and improvements can be made without departing from the spirit of the disclosure.

In each of the above embodiments, the dampening pads 110, 210, 310 and 410 have been illustrated and described as examples of the attachments, but the disclosure is not necessarily limited thereto. Of course, an electronic percussion instrument (electronic drum) may be used as an attachment supported on the drum 100.

In each of the above embodiments, the case where the outer diameters of the body parts 11 and 41 are smaller than the inner diameter of the annular part 103*b* of the hoop 103 in the pre-support state has been described, but the disclosure is not necessarily limited thereto. For example, it may be configured that the outer diameters of the body parts 11 and 41 in the pre-support state are equal to or larger than the inner diameter of the annular part 103*b* of the hoop 103.

When the outer diameters of the body parts 11 and 41 in the pre-support state is larger than the inner diameter of the annular part 103*b* of the hoop 103, it is sufficient that the body parts 11 and 41 (mount members 10, 20 and 30) have enough elasticity to be fitted to the inner peripheral side of the annular part 103*b* while decreasing the outer diameters of the body parts 11 and 41.

In each of the above embodiments, the outer peripheral parts 12 and 42 of the body parts 11 and 41 do not have to be in close contact with the inner peripheral surface of the hoop 103 (annular part 103*b*) of the drum 100 in the support state. That is, a gap may be formed between the outer peripheral parts 12 and 42 and the inner peripheral surface of the hoop 103. Even when such a gap is formed, since the weights of the dampening pads 110, 210, 310 and 410 act evenly over the entire circumference of the body parts 11 and 41 along the inclination directions of the body parts 11 and 41, the dampening pads 110, 210, 310 and 410 can be stably supported on the drum 100.

In each of the above embodiments, it may be configured that the body parts 11 and 41 are disposed on the inner peripheral side of the hoop 103 by forming the body parts 11 and 41 by using a resin or metal material having low elasticity, and by forming the outer diameters of the body parts 11 and 41 to be slightly smaller (for example, by 1 mm) than the inner diameter of the annular part 103*b* of the hoop 103. In the case of this configuration, since the body parts 11 and 41 are relatively difficult to be elastically deformed, depending on the variation in the shape of the hoop 103, the outer peripheral parts 12 and 42 of the body parts 11 and 41 may not be in close contact with the inner peripheral surface of the annular part 103*b* of the hoop 103 even in the support state.

That is, a gap may be formed between the outer peripheral parts 12 and 42 of the body parts 11 and 41 and the inner peripheral surface of the annular part 103*b* of the hoop 103. However, since the weights of the dampening pads 110, 210, 310 and 410 act evenly over the entire circumference of the body parts 11 and 41 along the inclination directions of the body parts 11 and 41, the dampening pads 110, 210, 310 and 410 can be stably supported on the drum 100.

In each of the above embodiments, the case where the thickness dimensions of the body parts 11 and 41 in a direction orthogonal to their inclination directions are formed to be substantially constant over the entire circumference has been described, but the disclosure is not necessarily limited thereto, and the body parts 11 and 41 may be formed with a thin part with a small thickness or a portion cut out partially. In this way, the elastic deformation of the body parts 11 and 41 is facilitated.

In the first to third embodiments, the case where the body part 11 of the mount members 10, 20 and 30 is formed in an annular shape has been described, but the disclosure is not necessarily limited thereto, and it may be configured that the body part 11 of the mount members 10, 20 and 30 is formed with a cut part that is partially divided in the circumferential direction (the mount members 10, 20 and 30 are formed in a C shape). In this way, the elastic deformation of the mount members 10, 20 and 30 (body part 11) is facilitated. Further, the shape in which the cut part is formed in the body part 11 of the mount members 10, 20 and 30 also corresponds to the "body part in an annular shape" of claim 1.

When the cut part is formed in the body part 11 of the mount members 10, 20 and 30, it is preferable that the outer diameter of the body part 11 is formed to be slightly larger than the inner diameter of the annular part 103*b* of the hoop 103 of the drum 100 in the pre-support state. With this configuration, the mount members 10, 20 and 30 are fitted into the inner peripheral side of the annular part 103*b* of the hoop 103 while decreasing the outer diameter of the body part 11 of the mount members 10, 20 and 30, whereby the outer peripheral part 12 of the body part 11 can be easily brought into close contact with the inner peripheral surface of the annular part 103*b* of the hoop 103.

In the third embodiment, the body part 11 and the support part 35 of the mount member 30 may be formed in a linear shape along the up-down direction (axis O direction). In other words, the outer diameter and the inner diameter of the mount member 30 may be formed to be constant from the upper end to the lower end of the mount member 30.

In the first to third embodiments described above, the case where the dampening pads 110, 210 and 310 and the mount members 10, 20 and 30 are separate bodies has been described, but the disclosure is not necessarily limited thereto. For example, the mount members 10, 20 and 30 and the dampening pads 110, 210 and 310 (separate bodies) may be configured to be connectable. Specific methods for connecting, for example, include adhering them to each other and forming protruding parts and recessed parts that can be fitted to each other on the mount members 10, 20 and 30 and the dampening pads 110, 210 and 310. Further, the dampening pads 110, 210 and 310 and the mount members 10, 20 and 30 may be formed integrally.

What is claimed is:

1. A support body in an annular shape for supporting an attachment on a head of a drum, the support body comprising:

a body part in an annular shape configured to be able to directly or indirectly support the attachment, wherein the attachment is configured to be supportable via the body part by making a lower end part of the body part be supported by an edge part of the head, wherein the edge part of the head is an outer peripheral side of a connecting portion between an outer inclined part and an inner inclined part of a shell.

2. The support body according to claim 1, wherein the body part has a diameter that is gradually decreased from a lower end side to an upper end side.

3. The support body according to claim 1, wherein the body part is configured to be elastically deformable to increase or decrease an outer diameter, and the body part is configured to be able to be in close contact with an inner peripheral side of a hoop of the drum by increasing or decreasing the outer diameter of the body part.

4. The support body according to claim 3, wherein the body part has a diameter that is gradually decreased from a lower end side to an upper end side, and the body part is configured to be elastically deformable to increase the outer diameter by supporting the attachment by the body part.

5. The support body according to claim 4, wherein a portion on an inner edge side of the body part is disposed at a predetermined distance from the head in a support state where the attachment is supported on the head via the support body.

6. The support body according to claim 5, further comprising:

a protruding part that protrudes upward from the inner edge side of the body part, wherein the protruding part is configured to be able to be in contact with an inner peripheral surface of a supported part in an annular shape that protrudes downward from a lower surface of the attachment in the support state.

7. The support body according to claim 6, wherein the protruding part is configured to be in an annular shape that extends upward from an inner peripheral side of the body part.

8. The support body according to claim 6, wherein the body part and the protruding part are formed integrally.

9. The support body according to claim 6, wherein the protruding part has a support part with a diameter that is gradually decreased from an upper end side to a lower end side, wherein the support part is configured to be elastically deformable to increase an outer diameter by supporting the attachment on an upper end part of the support part.

10. The support body according to claim 9, wherein the body part, the protruding part and the support part are formed integrally.

11. The support body according to claim 9, wherein the attachment comprises a dampening hoop that is fixed to the inner peripheral surface, and the outer diameter of the support part is formed to be smaller than an inner diameter of an annular part of the dampening hoop by 1 mm or more.

12. The support body according to claim 6, wherein the attachment comprises a dampening shell in a tubular shape, and an outer diameter of the protruding part is formed to be smaller than an inner diameter of the dampening shell by 0.5 mm or more.

13. The support body according to claim 12, wherein the protruding part and the body part are formed integrally on the dampening shell.

14. The support body according to claim 1, further comprising a cut part that is partially divided in a circumferential direction.

15. The support body according to claim 9, wherein the body part and the support part are formed in a linear shape along an up-down direction.

16. A support body for supporting an attachment on a head of a drum, the support body comprising:

a body part configured to be able to directly or indirectly support the attachment, wherein the attachment is configured to be supportable via the body part by making the body part be supported by an edge part of the head, wherein the edge part of the head is an outer peripheral side of a connecting portion between an outer inclined part and an inner inclined part of a shell.

17. An attachment, wherein the support body according to claim 1 is integrally formed on a lower surface of the attachment.

18. The attachment according to claim 17, wherein the body part is elastically deformed by the weight of a dampening pad to increase an outer diameter of the body part.

19. A support method for supporting an attachment on a head of a drum via a support body, wherein the support body comprises a body part in an annular shape, the support method comprising:

supporting the attachment via the body part by supporting the attachment directly or indirectly by the body part and by making a lower end part of the body part be supported by an edge part of the head, wherein the edge part of the head is an outer peripheral side of a connecting portion between an outer inclined part and an inner inclined part of a shell.

20. The support method according to claim 19, wherein an outer diameter of the body part is increased or decreased by an elastical deformation of the support body, and the body part is in close contact with an inner peripheral side of a hoop of the drum by increasing or decreasing the outer diameter of the body part.

21. The support method according to claim 19, wherein the body part is elastically deformed by the weight of a dampening pad to increase an outer diameter of the body part.

22. The support body according to claim 1, wherein a lower end side of the body part is disposed at an inner peripheral side of a hoop of the drum.

* * * * *